United States Patent
Pang et al.

(10) Patent No.: US 10,032,082 B2
(45) Date of Patent: Jul. 24, 2018

(54) METHOD AND APPARATUS FOR DETECTING ABNORMAL SITUATION

(71) Applicants: Bo Pang, Beijing (CN); Shengyin Fan, Beijing (CN); Xin Wang, Beijing (CN); Qian Wang, Beijing (CN); Gang Wang, Beijing (CN)

(72) Inventors: Bo Pang, Beijing (CN); Shengyin Fan, Beijing (CN); Xin Wang, Beijing (CN); Qian Wang, Beijing (CN); Gang Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 101 days.

(21) Appl. No.: 15/143,718

(22) Filed: May 2, 2016

(65) Prior Publication Data
US 2017/0024874 A1 Jan. 26, 2017

(30) Foreign Application Priority Data
May 11, 2015 (CN) .......................... 2015 1 0234672

(51) Int. Cl.
G06K 9/00 (2006.01)
(52) U.S. Cl.
CPC ..... G06K 9/00771 (2013.01); G06K 9/00389 (2013.01)
(58) Field of Classification Search
CPC ................. G06K 9/00389; G06K 9/00771
See application file for complete search history.

(56) References Cited

U.S. PATENT DOCUMENTS

| | | | | |
|---|---|---|---|---|
| 7,003,136 B1* | 2/2006 | Harville | ............ | G06K 9/00201 348/169 |
| 9,805,249 B2* | 10/2017 | Cheng | ............... | G06K 9/00771 |
| 2004/0153671 A1* | 8/2004 | Schuyler | ................. | G07C 9/00 726/9 |
| 2009/0244309 A1* | 10/2009 | Maison | ............. | G06K 9/00369 348/222.1 |
| 2014/0148733 A1* | 5/2014 | Stone | ..................... | A61B 5/004 600/595 |
| 2015/0080765 A1* | 3/2015 | Lampe | ................... | A61B 5/112 600/595 |
| 2015/0332463 A1* | 11/2015 | Galera | .............. | G06K 9/00771 382/103 |
| 2016/0073614 A1* | 3/2016 | Lampe | ................... | A01L 11/00 600/408 |
| 2016/0267328 A1* | 9/2016 | Fan | .................... | G06K 9/00771 |

* cited by examiner

*Primary Examiner* — Bhavesh Mehta
*Assistant Examiner* — Ian Lemieux
(74) *Attorney, Agent, or Firm* — Harness, Dickey & Pierce, P.L.C.

(57) ABSTRACT

A method and an apparatus for detecting an abnormal situation are disclosed. The method includes recognizing whether a detection target exists in a captured image; generating, based on the captured image, a three-dimensional point cloud of the detection target in the captured image, when the detection target exists; obtaining, based on the generated three-dimensional point cloud, one or more current posture features of the detection target; and determining, based on the current posture features and one or more predetermined posture feature standards, whether the abnormal situation exists, the posture feature standards being previously determined based on one or more common features when the detection target performs a plurality of abnormal actions.

20 Claims, 5 Drawing Sheets

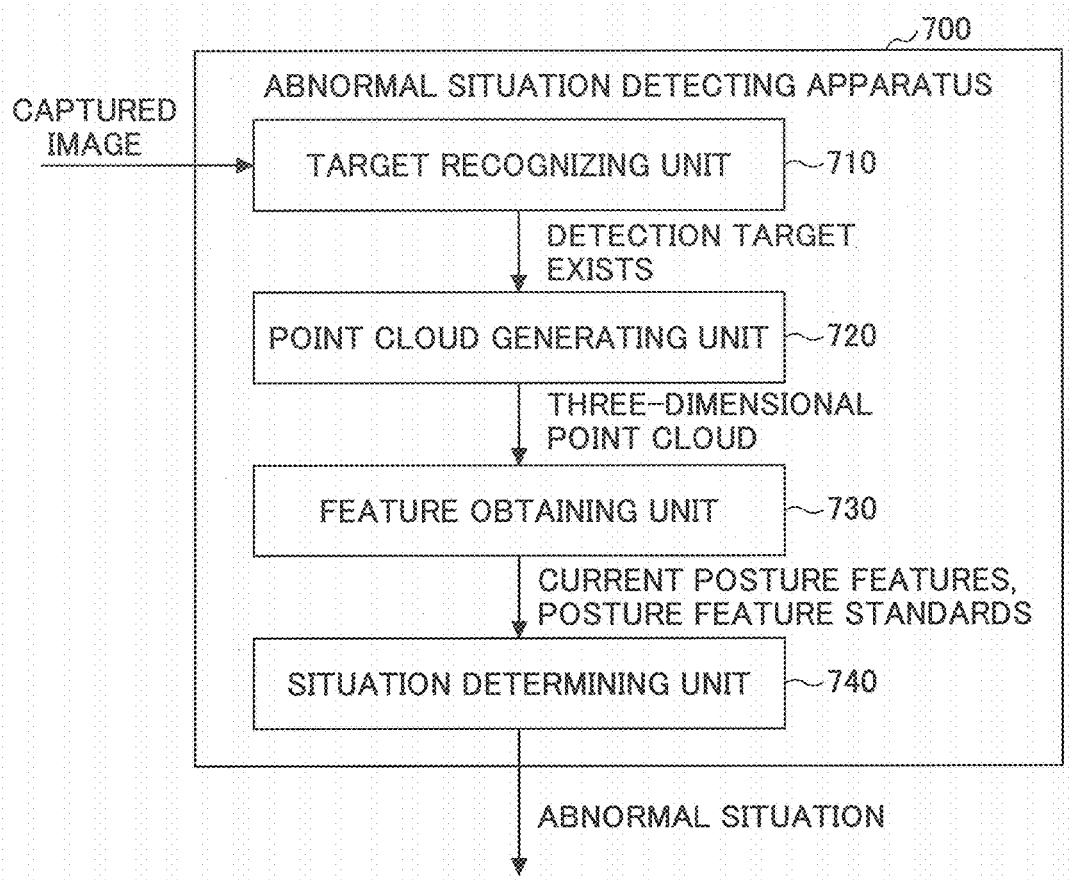
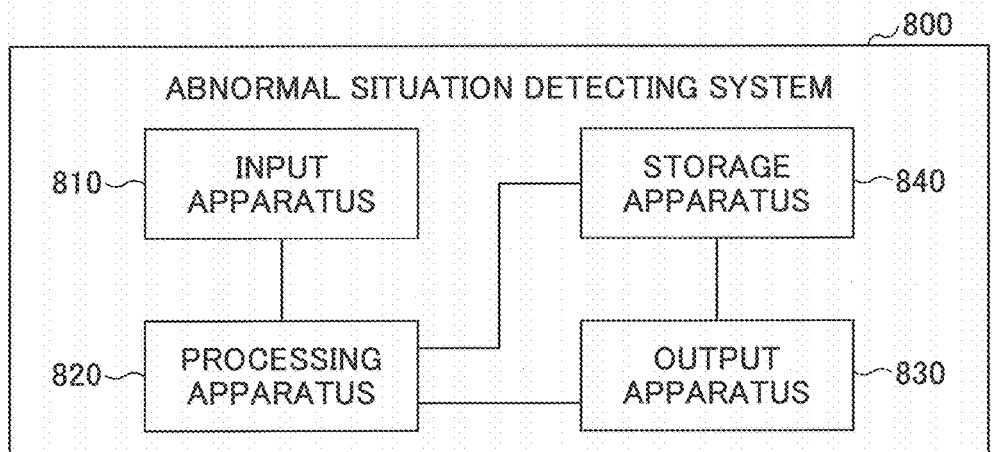

METHOD AND APPARATUS FOR DETECTING ABNORMAL SITUATION

BACKGROUND OF THE INVENTION

1. Field of the Invention

The present invention relates to methods and apparatuses for detecting an abnormal situation, and specifically, relates to a method and an apparatus for detecting an abnormal situation based on whether a detection target holds an object.

2. Description of the Related Art

With the development of the technology and the improvement of the safety awareness of the people, a monitoring system is installed in more and more public places (such as public areas of stations, airports, banks, and office buildings). It is very important for establishment of an effective monitoring system to discover and recognize an abnormal situation existing in these public places. By recognizing an abnormal situation, a potential safety risk in a public place can be detected, and damage to the people and facilities can be avoided by taking a rapid response to the potential safety risk. Detection of abnormal behavior of a target (such as a person) is a very important part in abnormal situation recognition. The abnormal behavior of a detection target may include, for example, acts of vandalism, posting advertisements on a wall, and posting a threat to another person.

A method that includes obtaining a current action of a detection target by recognizing an image captured by a camera of a monitoring system, performing matching between the current action of the detection target and pre-defined abnormal action templates, and determining whether the current action of the detection target is a specific abnormal action is provided. However, in this method, it is usually necessary to respectively pre-define templates for abnormal actions to be recognized. For example, templates are respectively pre-defined for a waving action, a throwing action, and a shooting action of the detection target. It is determined whether the current action is an abnormal action by comparing the current action of the detection target and the established templates. As a result, it is necessary to previously perform complicated processes of this method, it is difficult to recognize a dangerous action, which does not belong to the pre-defined abnormal action templates.

Moreover, the image captured by the camera of the conventional monitoring system is easily influenced by factors such as light and change of a viewing angle, and the detection target is often shielded by an obstacle in the captured image. Thus, the captured image often cannot accurately reflect dangerousness of the detection target.

SUMMARY OF THE INVENTION

In view of the above problems, the present invention has an object to provide a method and an apparatus that can determine dangerousness of a target.

According to an aspect of the present invention, a method for detecting an abnormal situation includes: recognizing whether a detection target exists in a captured image; generating, based on the captured image, a three-dimensional point cloud of the detection target in the captured image, when the detection target exists; obtaining, based on the generated three-dimensional point cloud, one or more current posture features of the detection target; and determining, based on the current posture features and one or more predetermined posture feature standards, whether the abnormal situation exists, the posture feature standards being previously determined based on one or more common features when the detection target performs a plurality of abnormal actions.

According to another aspect of the present invention, an apparatus for detecting an abnormal situation includes: a target recognizing unit configured to recognize whether a detection target exists in a captured image; a point cloud generating unit configured to generate, based on the captured image, a three-dimensional point cloud of the detection target in the captured image, when the detection target exists; a feature obtaining unit configured to obtain, based on the generated three-dimensional point cloud, one or more current posture features of the detection target; and a situation determining unit configured to determine, based on the current posture features and one or more predetermined posture feature standards, whether the abnormal situation exists, the posture feature standards being previously determined based on one or more common features when the detection target performs a plurality of abnormal actions.

An abnormal situation occurring in a public place is usually caused by an abnormal action of a detection target. According to the method and the apparatus for detecting the abnormal situation of embodiments of the present invention, it is determined whether the abnormal situation exists based on the common features when the detection target performs a plurality of abnormal actions. By this way, complicated processes of establishing and training of abnormal action templates can be avoided, it is easy to deploy and implement the method and the apparatus, and it is unnecessary to perform comparison between the abnormal action and the abnormal action templates in actual use; accordingly, it is possible to quickly and accurately determine whether an abnormal situation exists. Additionally, compared with the conventional method which can recognize only specific abnormal actions, the method according to the embodiments of the present invention is not limited by the templates of specific abnormal actions, and can evaluate any posture of the detection target. Thus, the method and the apparatus for detecting the abnormal situation according to the embodiments of the present invention can be flexibly and effectively applied in an actual monitoring scene where a large number of variable abnormal situation may emerge.

BRIEF DESCRIPTION OF THE DRAWINGS

FIG. 7 is a structure block diagram illustrating an abnormal situation detecting apparatus according to an embodiment of the present invention; and FIG. 8 is an overall hardware block diagram illustrating an abnormal situation detecting system according to an embodiment of the present invention.

DETAILED DESCRIPTION OF THE PREFERRED EMBODIMENTS

In the following, embodiments of the present invention are described in detail with reference to the accompanying drawings, so as to facilitate the understanding of the present invention. It should be noted that, in the specification and the drawings, the steps and the units that are essentially the same are represented by the same symbols, and the repetitive description of these steps and units will be omitted.

The method and the apparatus for detecting an abnormal situation according to the embodiments of the present invention may be applied in a monitoring system with a camera. For example, the camera may be, for example, a stereo camera such as a binocular camera. Additionally, specific forms of the stereo camera are not limited to this, and the stereo camera may also be any camera that can obtain depth information of a target in an image, such as a trinocular camera, or a camera based on TOF or an active light mode. Additionally, in the embodiments of the present invention, the camera in the monitoring system may photograph a specific scene to be monitored, and a captured image may be an image of the specific scene obtained by the camera.

Figure 1:
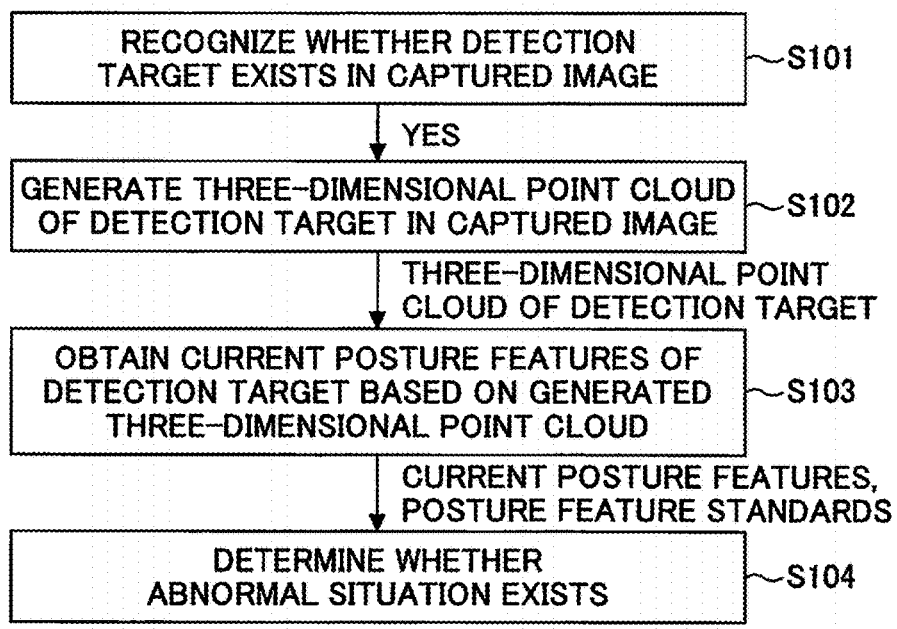
FIG. 1 is a flowchart illustrating an abnormal situation detecting method according to an embodiment of the present invention.

FIG. 1 is a flowchart illustrating an abnormal situation detecting method according to an embodiment of the present invention. In the following, the abnormal situation detecting method according to the embodiment of the present invention will be described with reference to FIG. 1. As shown in FIG. 1, in step S101, it is recognized whether a detection target exists in a captured image. The detection target to be recognized in the image may be preset. For example, the detection target may be a person, and may also be another target that can perform an action. When the detection target exists, in step S102, a three-dimensional point cloud of the detection target in the captured image is generated based on the captured image.

According to an example of the present invention, background modeling may be performed using a depth image, which is generated based on depth information obtained by the camera, so that a foreground is extracted. Specifically, a position of the detection target (such as a person) in the captured image may be determined using the depth information obtained by the camera, and the detection target may be determined as the foreground. The background model of the image may be generated using a conventional background modeling method. The background modeling may be static background modeling, and may also be dynamic background modeling constructed by using a Gaussian mixture model. And then, foreground pixels in the visual image and the depth image are respectively extracted using a background subtraction method in step S102, so that the three-dimensional point cloud of the detection target is generated.

Preferably, according to an example of the present invention, noise reduction processing may be performed for the three-dimensional point cloud to simplify subsequent processing. A known noise reduction method may be used here for the three-dimensional point cloud. For example, a noise reduction algorithm of local optimization projection may be used.

And then, in step S103, one or more current posture features of the detection target are obtained based on the generated three-dimensional point cloud. And then, in step S104, it is determined whether the abnormal situation exists, based on the current posture features obtained in step S103, and one or more predetermined posture feature standards. The posture feature standards are previously determined based on one or more common features when the detection target performs a plurality of abnormal actions.

According to an example of the present invention, the plurality of abnormal actions may include a plurality of actions whose types are different, such as a waving action, a throwing action, a shooting action, and a jumping action. According to research for various actions by the inventor of the present invention, when performing the above abnormal actions, for a detection target such as a person, common features, such as limb extension, an increase of the volume of a circumscribed polygon of the limbs, deterioration of posture symmetry, and holding an object usually appear. Accordingly, the posture feature standards for determining the abnormal actions may be generated based on these common posture features.

For example, the common features for determining the posture feature standards may include at least one of a size, a degree of limb extension, a height of limb and posture symmetry of the detection target, and a size of an object held by the detection target. Accordingly, the posture feature standards previously determined based on the common features may include at least one of a standard for volume of a circumscribed cube of the detection target, which indicates the size, the degree of limb extension, and the height of limb of the detection target; a standard for a center position of the detection target, which indicates the height of limb and the posture symmetry of the detection target; a standard for projection mapping of the detection target in three adjacent views, which indicates the size, the degree of limb extension, the height of limb and the posture symmetry of the detection target, and the object held by the detection target; and a standard for symmetry of top-view projection mapping of the detection target, which indicates the posture symmetry of the detection target.

In this case, the current posture features of the detection target obtained based on the generated three-dimensional point cloud in step S103 may include at least one of current volume of a circumscribed cube, a current center position, current projection mapping in three adjacent views, and current symmetry of top-view projection mapping of the detection target, which are obtained based on the generated three-dimensional point cloud. Furthermore, in step S104, it may be determined whether the abnormal situation exists, based on the current posture features, and the predetermined posture feature standards corresponding to the current posture features.

For example, the current posture features of the detection target may include the volume of the circumscribed cube of the detection target. Specifically, in step S103, the volume of the circumscribed cube of the generated three-dimensional point cloud may be calculated as the current volume of the circumscribed cube of the detection target. The posture feature standards may include the standard for the volume of the circumscribed cube of the detection target. As described above, the larger the degree of extension of the limbs of the detection target (such as the limbs of a person) is, or the greater the height of limb ends (such as hands and feet) is, the greater probability of the abnormal situation existing is, and accordingly, the larger the volume of the circumscribed cube of the detection target is. Thus, the larger the volume of the circumscribed cube of the detection target, which is calculated in step S103, is, the greater probability of the abnormal situation existing is, when determining the probability of the abnormal situation existing based on the posture feature standards in step S104. Otherwise, it may be determined that the probability of the abnormal situation existing is small.

Figure 2:
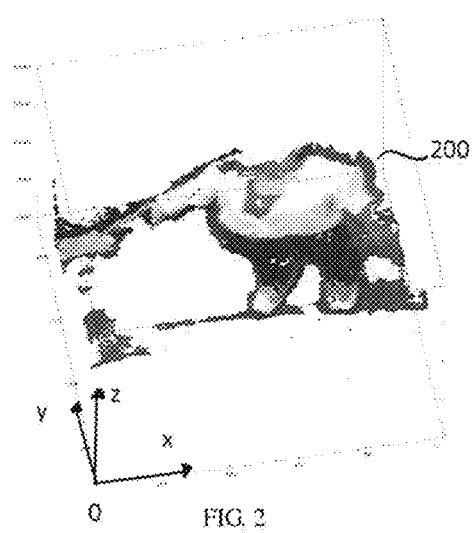
FIG. 2 is a schematic drawing illustrating a three-dimensional point cloud of a detection target according to an embodiment of the present invention.

FIG. 2 is a schematic drawing illustrating a three-dimensional point cloud 200 of a detection target according to an embodiment of the present invention. In a three-dimensional space represented by an X-axis, a Y-axis and a Z-axis shown in FIG. 2, the volume of the circumscribed cube of the three-dimensional point cloud 200 $Score_{cubic}$ may be calculated by the following equation (1).

$$Score_{cubic} = (\max(X) - \min(X)) \times (\max(Y) - \min(Y)) \times (\max(Z) - \min(Z)) \quad (1)$$

Where X represents a set of X-coordinates of the three-dimensional point cloud 200, Y represents a set of Y-coordinates of the three-dimensional point cloud 200, and Z represents a set of Z-coordinates of the three-dimensional point cloud 200.

As another example, the current posture features of the detection target may include the current center position of the detection target. Specifically, in step S103, the center position of the generated three-dimensional point cloud may be calculated as the current center position of the detection target. The posture feature standards may include the standard for the center position of the detection target. As described above, the higher the height of limb ends (such as hands and feet) is, the greater probability of the abnormal situation existing is, and accordingly, the higher the center position is. Furthermore, the heavier and larger an object held by the detection target is, the greater probability of the abnormal situation existing is, and accordingly, the more the center position is far away from a center line of a portion of the detection target except the held object.

Figure 3A:
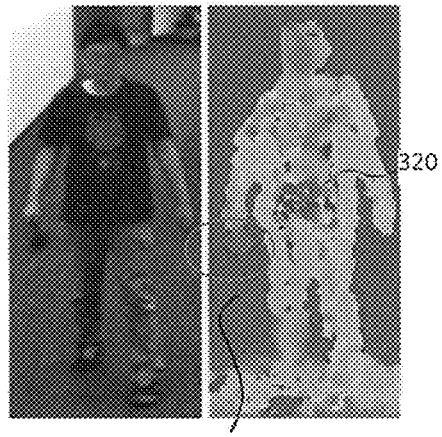
FIG. 3A is a depth image of a detection target holding an object according to an embodiment of the present invention.
Figure 3B:
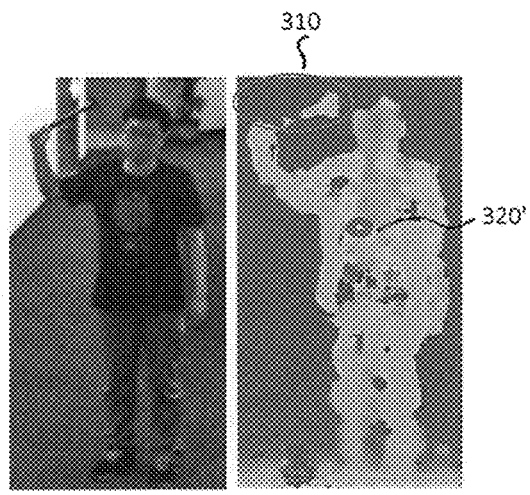
FIG. 3B is a depth image of a detection target holding an object according to another embodiment of the present invention.

FIG. 3A is a depth image of a detection target holding an object according to an embodiment of the present invention. FIG. 3B is a depth image of a detection target holding an object according to another embodiment of the present invention. In FIGS. 3A and 3B, the detection targets hold the corresponding objects 310. In the example shown in FIG. 3A, the arm of the detection target is lowered and is near the body, accordingly the center position 320 of the detection target is low and is near the center line of the portion of the detection target except the held object. On the other hand, in the example shown in FIG. 3B, the arm of the detection target is raised and is outstretched, accordingly the center position 320' of the detection target is high and is far away from the center line of the portion of the detection target except the held object.

Accordingly, a reference center position of the detection target when no abnormal action is performed may be preset. The larger distance between the current center position of the detection target calculated in step S103 and the reference center position is, and/or the higher the current center position of the detection target is, the greater probability of the abnormal situation existing is, when determining the probability of the abnormal situation existing based on the posture feature standards in step S104. Otherwise, it may be determined that the probability of the abnormal situation existing is small.

In the example shown in FIG. 2, the distance between the current center position of the circumscribed cube of the three-dimensional point cloud 200 of the detection target and the reference center position $Score_{center}$ may be calculated by the following equation (2).

$$Score_{center} = \|P_{base} - \text{mean}(X, Y, X)\|_2 \quad (2)$$

Where $P_{base}$ represents the preset reference center position.

As another example, the current posture features of the detection target may include projection mapping of the detection target in the three adjacent views. Specifically, in step S103, projection mapping of the three-dimensional point cloud in the three adjacent views may be generated as the current projection mapping of the detection target in the three adjacent views. The projection mapping in each view consists of farthest points at respective projection cells in the three-dimensional point cloud from the view in a direction perpendicular to the view.

Figures 4A, 4B:
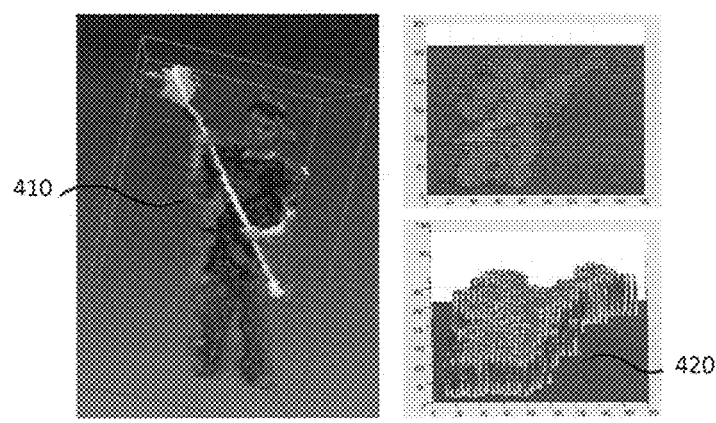
FIG. 4A is a front view of a three-dimensional point cloud of a detection target according to an embodiment of the present invention.
FIG. 4B is a schematic drawing illustrating projection mapping in the front view, which is generated based on the three-dimensional point cloud.
Figures 5A, 5B:
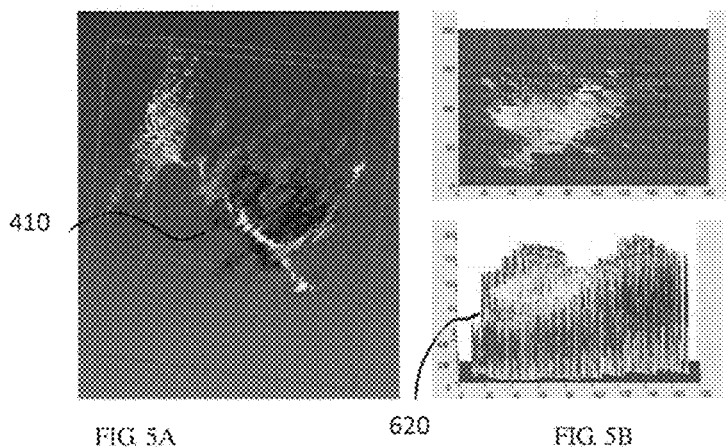
FIG. 5A is a top view of the three-dimensional point cloud of the detection target according to the embodiment of the present invention.
FIG. 5B is a schematic drawing illustrating projection mapping in the top view, which is generated based on the three-dimensional point cloud.
Figures 6A, 6B:
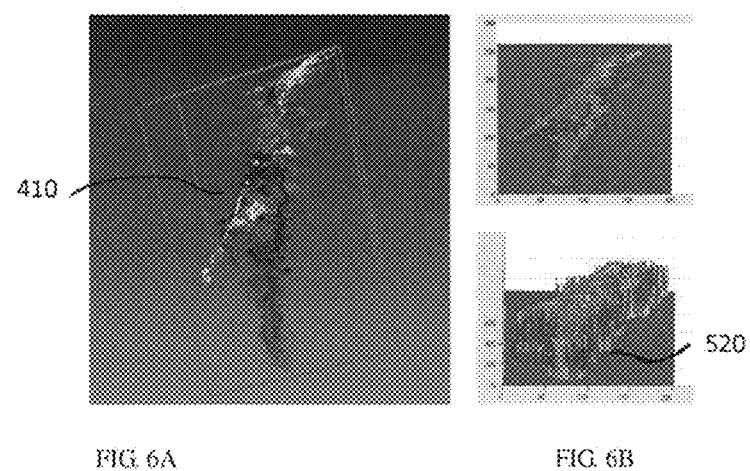
FIG. 6A is a side view of the three-dimensional point cloud of the detection target according to an embodiment of the present invention.
FIG. 6B is a schematic drawing illustrating projection mapping in the side view, which is generated based on the three-dimensional point cloud.

According to an example of the present invention, in step S103, the projection mapping of the three-dimensional point cloud in a front view, a side view and a top view may be generated. FIG. 4A is a front view of a three-dimensional point cloud 410 of a detection target according to an embodiment of the present invention. FIG. 4B is a schematic drawing illustrating projection mapping 420 in the front view, which is generated based on the three-dimensional point cloud 410. As shown in 4B, the projection mapping 420 in the front view consists of farthest points at respective projection cells (such as pixels) in the three-dimensional point cloud 410 from the front view in a direction perpendicular to the front view. FIG. 5A is a top view of the three-dimensional point cloud 410 of the detection target according to the embodiment of the present invention. FIG. 5B is a schematic drawing illustrating projection mapping 520 in the top view, which is generated based on the three-dimensional point cloud 410. As shown in FIG. 5B, the projection mapping 520 in the top view consists of farthest points at respective projection cells in the three-dimensional point cloud 410 from the top view in a direction perpendicular to the side view. FIG. 6A is a side view of the three-dimensional point cloud 410 of the detection target according to an embodiment of the present invention. FIG. 6B is a schematic drawing illustrating projection mapping 620 in the side view, which is generated based on the three-dimensional point cloud 410. As shown in 6B, the projection mapping 620 in the side view consists of farthest points at respective projection cells in the three-dimensional point cloud 410 from the top view in a direction perpendicular to the side view.

The posture feature standards may include the standard for the projection mapping of the detection target in the three adjacent views. As described above, the larger the degree of extension of the limbs of the detection target (such as the limbs of a person) is, the higher the height of limb ends (such as hands and feet) is, or the larger the held object is, the greater probability of the abnormal situation existing is, and accordingly, the larger the volume of a space enclosed by the projection mapping in the three adjacent views is. According to an example of the present invention, a sum of pixel values of points (i.e., coordinate values of the points in a direction perpendicular to the view) in the current projection mapping of the detection target in the three adjacent views may be calculated in step S104, so as to determine the volume of the space enclosed by the projection mapping in the three adjacent views. The larger the sum of the pixel values of the points in the projection mapping in the three adjacent views is, the greater probability of the abnormal situation existing is, when determining the probability of the abnormal situation existing based on the posture feature standards in step S104. Otherwise, it may be determined that the probability of the abnormal situation existing is small.

Additionally, in a public place, the detection target may be shielded by another person or another object. In this case, compared with projection mapping that is shielded, projection mapping that is not shielded in the view can accurately reflect the status of the detection target. According to an example of the present invention, a weighting factor for each current projection mapping in each view may be generated based on a degree of shielding of the detection target in each view. And then, the sum of the pixel values of the points in the projection mapping in the three adjacent views may be calculated based on the weighting factors. Specifically, in step S104, the current degree of shielding against the detection target in the three adjacent views may be determined based on the generated three-dimensional point cloud. The weighting factor for each current projection mapping in the three adjacent views is generated based on the determined degree of shielding. For example, it is determined that the degree of shielding against the detection target in the side view is serious, and the detection target is not shielded in the top view and the front view, based on the generated three-dimensional point cloud. In this case, a relatively small weight factor may be generated for the projection mapping in the side view, and a relatively large weight factor may be generated for the projection mapping in the front view and the top view. And then, the sum of the pixel values of the current projection mapping in the three adjacent views is calculated, based on the generated weighting factors and the current projection mapping in the three adjacent views. For example, the sum of the pixel values of the current projection mapping in the three adjacent views $Score_{3map}$ may be calculated by the following equation (3).

$$Score_{3map}=w_f \cdot Score_{mapf}+w_s \cdot Score_{maps}+w_t \cdot Score_{mapt} \quad (3)$$

Where $w_f$ represents the weighting factor of the projection mapping in the front view, $w_s$ represents the weighting factor of the projection mapping in the side view, $w_t$ represents the weighting factor of the projection mapping in the top view, $Score_{mapf}$ represents the sum of the pixel values of the projection mapping in the front view, $Score_{maps}$ represents the sum of the pixel values of the projection mapping in the side view, and $Score_{mapt}$ represents the sum of the pixel values of the projection mapping in the top view. The larger the calculated sum of the pixel values of the current projection mapping in the three adjacent views is, the greater probability of the abnormal situation existing is.

As another example, the current posture features of the detection target may include the current symmetry of the top-view projection mapping of the detection target. Specifically, in step S103, top-view projection mapping of the three-dimensional point cloud in the top-view may be generated as current top-view projection mapping of the detection target, and the current symmetry of the top-view projection mapping may be determined. In step S103, the generated current top-view projection mapping may be rotated, and the current symmetry of the top-view projection mapping may be determined based on the current top-view projection mapping before the rotation and the current top-view projection mapping after the rotation. For example, in step S103, the current top-view projection mapping may be rotated by 180 degrees, a difference between the current top-view projection mapping before the rotation and the current top-view projection mapping after the rotation may be obtained by comparing those two, and the current symmetry of the top-view projection mapping may be determined based on the difference between those two. Preferably, ellipse fitting may be performed for the current top-view projection mapping, and the current top-view projection mapping may be rotated around an axis perpendicular to the obtained ellipse serving as a rotation axis.

The posture feature standards may include the standard for the symmetry of the top-view projection mapping of the detection target. As described above, the worse the symmetry of the detection target is, the greater probability of the abnormal situation existing is. Accordingly, the worse the symmetry of the top-view projection mapping generated in step S103 is, the greater probability of the abnormal situation existing is, when determining the probability of the abnormal situation existing based on the posture feature standards in step S104. Otherwise, it may be determined that the probability of the abnormal situation existing is small.

Additionally, according to an example of the present invention, when a plurality of the current posture features are obtained in step S103, a weighting factor may be generated for each current posture feature. In step S104, for each current posture feature, it is determined whether the abnormal situation exists based on the predetermined posture feature standard corresponding to the feature; and then, it is finally determined whether the abnormal situation exists based on the determination results of the features and their weighting factors.

A weighting factor may be preset for each posture feature. For example, both of the current volume of the circumscribed cube and the current projection mapping in the three adjacent views can represent the degree of extension of the limbs of the detection target, and the volume of the space enclosed by the current projection mapping in the three adjacent views is more accurate; accordingly, a relatively large weight factor may be assigned to the current projection mapping in the three adjacent views, and a relatively small weighting factor may be assigned to the current volume of the circumscribed cube. Furthermore, the weighting factor of each posture feature may also be calculated based on another factor such as a degree of shielding.

According to the abnormal situation detecting method of the embodiment of the present invention, it is determined whether the abnormal situation exists based on the common features when the detection target performs a plurality of abnormal actions. By this way, complicated processes of establishing and training of abnormal action templates can be avoided, it is easy to deploy and implement the method and the apparatus, and it is unnecessary to perform comparison between the abnormal action and the abnormal action templates in actual use; accordingly, it is possible to quickly and accurately determine whether an abnormal situation exists.

Additionally, compared with the conventional method which can recognize only specific abnormal actions, the method according to the embodiment of the present invention is not limited by the templates of specific abnormal actions, and can evaluate any posture of the detection target. Thus, the abnormal situation detecting method according to the embodiment of the present invention can be flexibly and effectively applied in an actual monitoring scene where a large number of variable abnormal situation may emerge.

Furthermore, according to the abnormal situation detecting method of the embodiment of the present invention, it is possible to determine whether the abnormal situation exists based on only the image of a current frame and the predetermined posture feature standards rather than historical data of the previous detection targets. Thus, calculation for determining the abnormal situation can be simplified.

In the following, an abnormal situation detecting apparatus according to an embodiment of the present invention will be described with reference to FIG. 7. FIG. 7 is a structure block diagram illustrating the abnormal situation detecting apparatus 700 according to the embodiment of the present invention. As shown in FIG. 7, the abnormal situation detecting apparatus 700 may include a target recognizing unit 710, a point cloud generating unit 720, a feature obtaining unit 730, and a situation determining unit 740. The units in the abnormal situation detecting apparatus 700 may respectively execute the steps/functions in the abnormal situation detecting method in FIG. 1. Accordingly, only main units of the abnormal situation detecting apparatus 700 will be described below, and the detailed descriptions that have been described above with reference to FIG. 1 will be omitted.

Specifically, the target recognizing unit 710 recognizes whether a detection target exists in a captured image. The detection target to be recognized in the image may be preset. For example, the detection target may be a person, and may also be another target that can perform an action. When the detection target exists, the point cloud generating unit 720 generates a three-dimensional point cloud of the detection target in the captured image based on the captured image.

According to an example of the present invention, background modeling may be performed using a depth image, which is generated based on depth information obtained by the camera, so that a foreground is extracted. Specifically, a position of the detection target (such as a person) in the captured image may be determined using the depth information obtained by the camera, and the detection target may be determined as the foreground. The background model of the image may be generated using a conventional background modeling method. The background modeling may be static background modeling, and may also be dynamic background modeling constructed by using a Gaussian mixture model. And then, the point cloud generating unit 720 respectively extracts foreground pixels in the visual image and the depth image using a background subtraction method, so that the three-dimensional point cloud of the detection target is generated.

Preferably, according to an example of the present invention, the point cloud generating unit 720 may perform noise reduction processing for the three-dimensional point cloud to simplify subsequent processing. A known noise reduction method may be used here for the three-dimensional point cloud. For example, a noise reduction algorithm of local optimization projection may be used.

And then, the feature obtaining unit 730 may obtain one or more current posture features of the detection target based on the generated three-dimensional point cloud. The situation determining unit determines whether the abnormal situation exists, based on the current posture features and one or more predetermined posture feature standards. The posture feature standards are previously determined based on one or more common features when the detection target performs a plurality of abnormal actions.

According to an example of the present invention, the plurality of abnormal actions may include a plurality of actions whose types are different, such as a waving action, a throwing action, a shooting action, and a jumping action. According to research for various actions by the inventor of the present invention, when performing the above abnormal actions, for a detection target such as a person, common features, such as limb extension, an increase of the volume of a circumscribed polygon of the limbs, deterioration of posture symmetry, and holding an object usually appear. Accordingly, the posture feature standards for determining the abnormal actions may be generated based on these common posture features.

For example, the common features for determining the posture feature standards may include at least one of a size, a degree of limb extension, a height of limb and posture symmetry of the detection target, and a size of an object held by the detection target. Accordingly, the posture feature standards previously determined based on the common features may include at least one of a standard for volume of a circumscribed cube of the detection target, which indicates the size, the degree of limb extension, and the height of limbs of the detection target; a standard for a center position of the detection target, which indicates the height of limbs and the posture symmetry of the detection target; a standard for projection mapping of the detection target in three adjacent views, which indicates the size, the degree of limb extension, the height of limbs and the posture symmetry of the detection target, and the object held by the detection target; and a standard for symmetry of top-view projection mapping of the detection target, which indicates the posture symmetry of the detection target.

In this case, the current posture features of the detection target obtained by the feature obtaining unit 730 based on the generated three-dimensional point cloud may include at least one of current volume of a circumscribed cube, a current center position, current projection mapping in three adjacent views, and current symmetry of top-view projection mapping of the detection target, which are obtained based on the generated three-dimensional point cloud. Furthermore, the situation determining unit 740 may determine whether the abnormal situation exists, based on the current posture features, and the predetermined posture feature standards corresponding to the current posture features.

For example, the current posture features of the detection target may include the volume of the circumscribed cube of the detection target. Specifically, the feature obtaining unit 730 may calculate the volume of the circumscribed cube of the generated three-dimensional point cloud as the current volume of the circumscribed cube of the detection target. The posture feature standards may include the standard for the volume of the circumscribed cube of the detection target. As described above, the larger the degree of extension of the limbs of the detection target (such as the limbs of a person) is, or the higher the height of limb ends (such as hands and feet) is, the greater probability of the abnormal situation existing is, and accordingly, the larger the volume of the circumscribed cube of the detection target is. Thus, the larger the volume of the circumscribed cube of the detection target, which is calculated by the feature obtaining unit 730, is, the greater probability of the abnormal situation existing is, when determining the probability of the abnormal situation existing by the situation determining unit 740 based on the posture feature standards. Otherwise, it may be determined that the probability of the abnormal situation existing is small. The situation determining unit 740 may calculate the volume of the circumscribed cube of the three-dimensional point cloud by the above equation (1).

As another example, the current posture features of the detection target may include the current center position of the detection target. Specifically, the feature obtaining unit 730 may calculate the center position of the generated three-dimensional point cloud as the current center position of the detection target. The posture feature standards may include the standard for the center position of the detection target. As described above, the higher the height of limb ends (such as hands and feet) is, the greater probability of the abnormal situation existing is, and accordingly, the higher the center position is. Furthermore, the heavier and larger an object held by the detection target is, the greater probability of the abnormal situation existing is, and accordingly, the more the center position is far away from a center line of a portion of the detection target except the held object. Accordingly, a reference center position of the detection target when no abnormal action is performed may be preset. The larger distance between the current center position of the detection target calculated by the feature obtaining unit 730 and the reference center position is, and/or the higher the current center position of the detection target is, the greater probability of the abnormal situation existing is, when determining the probability of the abnormal situation existing by the situation determining unit 740 based on the posture feature standards. Otherwise, the situation determining unit 740 may determine that the probability of the abnormal situation existing is small. The situation determining unit 740 may calculate the distance between the current center position of the circumscribed cube of the three-dimensional point cloud of the detection target and the reference center position by the above equation (2).

As another example, the current posture features of the detection target may include projection mapping of the detection target in the three adjacent views. Specifically, the feature obtaining unit 730 may generate projection mapping of the three-dimensional point cloud in the three adjacent views as the current projection mapping of the detection target in the three adjacent views. The projection mapping in each view consists of farthest points at respective projection cells in the three-dimensional point cloud from the view in a direction perpendicular to the view. According to an example of the present invention, in step S103, the feature obtaining unit 730 may generate the projection mapping of the three-dimensional point cloud in a front view, a side view and a top view.

The posture feature standards may include the standard for the projection mapping of the detection target in the three adjacent views. As described above, the larger the degree of extension of the limbs of the detection target (such as the limbs of a person) is, the higher the height of limb ends (such as hands and feet) is, or the larger the held object is, the greater probability of the abnormal situation existing is, and accordingly, the larger the volume of a space enclosed by the projection mapping in the three adjacent views is. According to an example of the present invention, the situation determining unit 740 may calculate a sum of pixel values of points (i.e., coordinate values of the points in a direction perpendicular to the view) in the current projection mapping of the detection target in the three adjacent views, so as to determine the volume of the space enclosed by the projection mapping in the three adjacent views. The larger the sum of the pixel values of the points in the projection mapping in the three adjacent views is, the greater probability of the abnormal situation existing is, when determining the probability of the abnormal situation existing by the situation determining unit 740 based on the posture feature standards. Otherwise, the situation determining unit 740 may determine that the probability of the abnormal situation existing is small.

Additionally, in a public place, the detection target may be shielded by another person or another object. In this case, compared with projection mapping that is shielded, projection mapping that is not shielded in the view can accurately reflect the status of the detection target. According to an example of the present invention, the situation determining unit 740 may generate a weighting factor for current projection mapping in each view based on a degree of shielding of the detection target in each view. And then, the sum of the pixel values of the points in the projection mapping in the three adjacent views may be calculated based on the weighting factors. Specifically, the situation determining unit 740 may determine the current degree of shielding against the detection target in the three adjacent views based on the generated three-dimensional point cloud. The weighting factor for each current projection mapping in the three adjacent views is generated based on the determined degree of shielding. For example, it is determined that the degree of shielding against the detection target in the side view is serious, and the detection target is not shielded in the top view and the front view, based on the generated three-dimensional point cloud. In this case, a relatively small weight factor may be generated for the projection mapping in the side view, and a relatively large weight factor may be generated for the projection mapping in the front view and the top view. And then, the sum of the pixel values of the current projection mapping in the three adjacent views is calculated, based on the generated weighting factors and the current projection mapping in the three adjacent views. For example, the sum of the pixel values of the current projection mapping in the three adjacent views $Score_{3map}$ may be calculated by the above equation (3). The larger the calculated sum of the pixel values of the current projection mapping in the three adjacent views is, the greater probability of the abnormal situation existing is.

As another example, the current posture features of the detection target may include the current symmetry of the top-view projection mapping of the detection target. Specifically, the feature obtaining unit 730 may generate top-view projection mapping of the three-dimensional point cloud in the top-view as current top-view projection mapping of the detection target, and may determine the current symmetry of the top-view projection mapping. The feature obtaining unit 730 may rotate the generated current top-view projection mapping, and may determine the current symmetry of the top-view projection mapping based on the current top-view projection mapping before the rotation and the current top-view projection mapping after the rotation. For example, the feature obtaining unit 730 may rotate the current top-view projection mapping by 180 degrees, may obtain a difference between the current top-view projection mapping before the rotation and the current top-view projection mapping after the rotation by comparing those two, and may determine the current symmetry of the top-view projection mapping based on the difference between those two. Preferably, ellipse fitting may be performed for the current top-view projection mapping, and the current top-view projection mapping may be rotated around an axis perpendicular to the obtained ellipse serving as a rotation axis.

The posture feature standards may include the standard for the symmetry of the top-view projection mapping of the detection target. As described above, the worse the symmetry of the detection target is, the greater probability of the abnormal situation existing is. Accordingly, the worse the symmetry of the top-view projection mapping generated by the feature obtaining unit 730 is, the greater probability of the abnormal situation existing is, when determining the probability of the abnormal situation existing by the situation determining unit 740 based on the posture feature standards. Otherwise, the situation determining unit 740 may determine that the probability of the abnormal situation existing is small.

Additionally, according to an example of the present invention, when a plurality of the current posture features are obtained, the feature obtaining unit 730 may generate a weighting factor for each current posture feature. The situation determining unit 740 may determine, for each current posture feature, whether the abnormal situation exists based on the predetermined posture feature standard corresponding to the feature; and then, the situation determining unit 740 may finally determine whether the abnormal situation exists based on the determination results of the features and their weighting factors.

A weighting factor may be preset for each posture feature. For example, both of the current volume of the circumscribed cube and the current projection mapping in the three adjacent views can represent the degree of extension of the limbs of the detection target, and the volume of the space enclosed by the current projection mapping in the three adjacent views is more accurate; accordingly, a relatively large weight factor may be assigned to the current projection mapping in the three adjacent views, and a relatively small weighting factor may be assigned to the current volume of the circumscribed cube. Furthermore, the weighting factor of each posture feature may also be calculated based on another factor such as a degree of shielding.

According to the abnormal situation detecting apparatus of the embodiment of the present invention, it is determined whether the abnormal situation exists based on the common features when the detection target performs a plurality of abnormal actions. By this way, complicated processes of establishing and training of abnormal action templates can be avoided, it is easy to deploy and implement the method and the apparatus, and it is unnecessary to perform comparison between the abnormal action and the abnormal action templates in actual use; accordingly, it is possible to quickly and accurately determine whether an abnormal situation exists.

Additionally, compared with the conventional apparatus which can recognize only specific abnormal actions, the apparatus according to the embodiments of the present invention is not limited by the templates of specific abnormal actions, and can evaluate any posture of the detection target. Thus, the abnormal situation detecting apparatus according to the embodiments of the present invention can be flexibly and effectively applied in an actual monitoring scene where a large number of variable abnormal situation may emerge.

Furthermore, according to the abnormal situation detecting apparatus of the embodiment of the present invention, it is possible to determine whether the abnormal situation exists based on only the image of a current frame and the predetermined posture feature standards rather than historical data of the previous detection targets. Thus, calculation for determining the abnormal situation can be simplified.

According to another embodiment of the present invention, the present invention may also be implemented as a system for detecting an abnormal situation. FIG. 8 is an overall hardware block diagram illustrating an abnormal situation detecting system 800 according to an embodiment of the present invention. As illustrated in FIG. 8, the abnormal situation detecting system 800 may include: an input apparatus 810 for inputting images captured by a stereo camera from the outside, including image transmission cables, image input ports, etc.; a processing apparatus 820 for implementing the above method for detecting the abnormal situation according to the embodiments of the present invention, such as a CPU of a computer or other chips having processing ability, etc., which are connected to a network such as the Internet (not shown) to transmit the processed results to the remote apparatus based on the demand of the processing; an output apparatus 830 for outputting the result obtained by implementing the above process of detecting the abnormal situation to the outside, such as a screen, a communication network and a remote output device connected thereto, etc.; and a storage apparatus 840 for storing the obtained images, data including the motion information of the first target and the object by a volatile method or a nonvolatile method, such as various kinds of volatile or nonvolatile memory including a random-access memory (RAM), a read-only memory (ROM), a hard disk and a semiconductor memory.

As known by a person skilled in the art, the present invention may be implemented as a system, an apparatus, a method or a computer program product. Therefore, the present invention may be specifically implemented as hardware, software (including firmware, resident software, micro-code, etc.) or a combination of hardware and software, which is referred to as a "circuit", "module", "apparatus" or "system". Additionally, the present invention may also be implemented as a computer program product in one or more computer-readable media, and the computer-readable media include computer-readable computer codes.

Any combinations of one or more computer-readable media may be used. The computer-readable medium may be a computer-readable signal medium or a computer-readable storage medium. The computer-readable storage medium may be, for example, a system, apparatus or an element of electric, magnetic, optic, electromagnetic, infrared or semiconductor, or a combination of any of the above, but is not limited to them. Specifically, the computer-readable storage medium may include a single electrical connection having a plurality of wires, a portable computer disk, a hard disk, a random access memory (RAM), a read-only memory (ROM), an erasable programmable read-only memory (an EPROM or a Flash memory), an optical fiber, a portable compact disc read-only memory (CD-ROM), an optical memory device, a magnetic storage device, or a suitable combination of any of the above. In the present specification, the computer-readable storage medium may include a tangible medium including or storing a program, and the program may be used by an instruction execution system, apparatus, device or a combination thereof.

The computer-readable signal medium may include data signals to be propagated as a part of a carrier wave, where computer-readable program codes are loaded. The propagated data signals may be electromagnetic signals, optical signals or a suitable combination thereof, but is not limited to these signals. The computer-readable medium may also be any computer-readable medium including the computer-readable storage medium. The computer-readable medium may send, propagate or transmit a program used by an instruction execution system, apparatus, device or a combination thereof.

The present invention is described with reference to the flowcharts and/or block diagrams of the method, apparatus (system) and computer program products according to the embodiments of the present invention. It should be noted that, each block and a combination of the blocks in the flowcharts and/or the block diagrams may be implemented by computer program instructions. The computer program instructions may be provided to a processor of a general-purpose computer, a special purpose computer or other programmable data processing apparatus, and the computer program instructions are executed by the computer or other programmable data processing apparatus to implement functions/operations in the flowcharts and/or the block diagrams.

The computer program instructions may also be stored in the computer-readable medium for making the computer or other programmable data processing apparatus operate in a specific manner, and the instructions stored in the computer-readable medium may generate manufactures of an instruction means for implementing the functions/operations in the flowcharts and/or the block diagrams.

The computer program instructions may also be loaded on the computer, other programmable data processing apparatus or other device, so as to execute a series of operation steps in the computer, other programmable data processing apparatus or other device, so that the instructions executed in the computer or other programmable apparatus can provide a process for implementing the functions/operations in the flowcharts and/or block diagrams.

The available system structure, functions and operations of the system, method and computer program product according to the present invention are illustrated by the flowcharts and block diagrams in the drawings. Each of the blocks in the flowcharts or block diagrams represent a module, program segment or a part of codes, and the module, program segment or the part of codes include one or more executable instructions for implementing logic functions. It should be noted that, in the apparatus or method of the present invention, units or steps may be divided and/or recombined. It should be noted that, block diagrams and/or blocks in flowcharts, and the combinations of block diagrams and/or blocks in flowcharts may be implemented using a system based on dedicated hardware for performing specific functions or operations, or may be implemented using a combination of dedicated hardware and computer commands.

The present invention is not limited to the specifically disclosed embodiments, and various modifications, combinations and replacements may be made without departing from the scope of the present invention.

The present application is based on and claims the benefit of priority of Chinese Priority Application No. 201510234672.3 filed on May 11, 2015, the entire contents of which are hereby incorporated by reference.

What is claimed is:

1. A method for detecting an abnormal situation, the method comprising:
   recognizing whether a detection target exists in a captured image;
   generating, based on the captured image, a three-dimensional point cloud of the detection target in the captured image, upon recognizing that the detection target exists in the captured image;
   obtaining, based on the generated three-dimensional point cloud, one or more current posture features of the detection target; and
   determining whether the abnormal situation exists based on the one or more obtained current posture features and one or more posture feature standards, the one or more posture feature standards being determined based on one or more common features and at a time when the detection target performs a plurality of abnormal actions, the one or more common features including at least one of a size, a degree of limb extension, a height of limb and posture symmetry of the detection target, and a size of an object held by the detection target.

2. The method for detecting an abnormal situation of claim 1,
   wherein the one or more obtained current posture features include at least one of a current volume of a circumscribed cube, a current center position, a current projection mapping in three adjacent views, and a current symmetry of top-view projection mapping of the detection target, obtained based on the generated three-dimensional point cloud,
   wherein the one or more posture feature standards include at least one of a standards for volume of a circumscribed cube, a standard for a center position, projection mapping in three adjacent views, and a standard for symmetry of top-view projection mapping of the detection target, and
   wherein the determining of whether the abnormal situation exists based on the one or more obtained current posture features and the one or more posture feature standards includes determining whether the abnormal situation exists based on the one or more current posture features, and the one or more posture feature standards corresponding to the one or more current posture features.

3. The method for detecting an abnormal situation of claim 2,
   wherein the obtaining of the one or more current posture features of the detection target based on the generated three-dimensional point cloud includes calculating a volume of the circumscribed cube of the generated three-dimensional point cloud as the current volume of the circumscribed cube of the detection target,
   wherein the one or more posture feature standards include the standard for the volume of the circumscribed cube of the detection target, and
   wherein a relatively larger volume of the circumscribed cube of the detection target is, the relatively greater a probability of the abnormal situation existing is, when determining the probability of the abnormal situation existing based on the one or more posture feature standards.

4. The method for detecting an abnormal situation of claim 2,
   wherein the obtaining of the one or more current posture features of the detection target based on the generated three-dimensional point cloud includes calculating the center position of the generated three-dimensional point cloud as the current center position of the detection target,
   wherein the one or more posture feature standards include the standard for the center position of the detection target, and
   wherein at least one of the relatively larger distance between the current center position of the detection target and a reference center position is, at least one of the relatively higher the current center position of the detection target is, the relatively greater a probability of the abnormal situation existing is, when determining the probability of the abnormal situation existing based on the one or more posture feature standards.

5. The method for detecting an abnormal situation of claim 2, wherein the obtaining of the one or more current posture features of the detection target based on the generated three-dimensional point cloud includes the generating of the projection mapping of the three-dimensional point cloud in the three adjacent views as the current projection mapping of the detection target in the three adjacent views, the projection mapping in each respective view including relatively farthest points at respective projection cells in the three-dimensional point cloud from the respective view in a direction perpendicular to the view, wherein the one or more posture feature standards include the standard for the projection mapping of the detection target in the three adjacent views, and wherein the relatively larger a sum of pixel values of the projection mapping of the detection target in the three adjacent views is, the relatively greater a probability of the abnormal situation existing is, when determining the probability of the abnormal situation existing based on the one or more posture feature standards.

6. The method for detecting an abnormal situation of claim 5, wherein the determining of whether the abnormal situation exists based on the one or more current posture features and the one or more posture feature standards includes determining, based on the generated three-dimensional point cloud, a current degree of shielding against the detection target in the three adjacent views, generating, based on the determined degree of shielding, a weighting factor for each current projection mapping in the three adjacent views, calculating, based on the generated weighting factors and the current projection mapping in the three adjacent views, a sum of the pixel values of the current projection mapping in the three adjacent views, and determining that the relatively larger the calculated sum of the pixel values of the current projection mapping of the detection target in the three adjacent views is, the relatively greater the probability of the abnormal situation existing is.

7. The method for detecting an abnormal situation of claim 2, wherein the obtaining of the current posture features of the detection target based on the generated three-dimensional point cloud includes generating top-view projection mapping of the three-dimensional point cloud in the top-view as current top-view projection mapping of the detection target, and determining the current symmetry of the top-view projection mapping, wherein the one or more posture feature standards include the standard for the symmetry of the top-view projection mapping of the detection target, and wherein the relatively worse the symmetry of the top-view projection mapping is, the relatively greater a probability of the abnormal situation existing is, when determining the probability of the abnormal situation existing based on the one or more posture feature standards.

8. The method for detecting an abnormal situation of claim 7, wherein the determining of the current symmetry of the top-view projection mapping includes rotating the current top-view projection mapping, and determining, based on the current top-view projection mapping before the rotation and the current top-view projection mapping after the rotation, the current symmetry of the top-view projection mapping, and wherein the determining of whether the abnormal situation exists based on the one or more current posture features and the one or more posture feature standards includes determining that the relatively worse the determined current symmetry of the top-view projection mapping is, the relatively greater the probability of the abnormal situation existing is.

9. The method for detecting an abnormal situation of claim 1, wherein the one or more posture feature standards previously determined based on the one or more common features include at least one of a standard for volume of a circumscribed cube of the detection target, indicating the size, the degree of limb extension, and the height of limb of the detection target;

a standard for a center position of the detection target, indicating the height of limb and the posture symmetry of the detection target;

a standard for projection mapping of the detection target in three adjacent views, indicating the size, the degree of limb extension, the height of limb and the posture symmetry of the detection target, and the object held by the detection target; and a standard for symmetry of top-view projection mapping of the detection target, indicating the posture symmetry of the detection target.

10. The method for detecting an abnormal situation of claim 9, wherein the plurality of abnormal actions include at least one of a waving action, a throwing action, a shooting action, and a jumping action.

11. The method for detecting an abnormal situation of claim 1, wherein the plurality of abnormal actions include at least one of a waving action, a throwing action, a shooting action, and a jumping action.

12. An apparatus for detecting an abnormal situation, the apparatus comprising:

a first memory storing computer-readable instructions; and one or more processors configured to execute the computer-readable instructions to recognize whether a detection target exists in a captured image;

generate, based on the captured image, a three-dimensional point cloud of the detection target in the captured image, upon recognizing that the detection target exists in the captured image;

obtain, based on the generated three-dimensional point cloud, one or more current posture features of the detection target; and determine whether the abnormal situation exists; based on the one or more obtained current posture features and one or more posture feature standards, the one or more processors being configured to determine the one or more posture feature standards based on one or more common features and at a time when the detection target performs a plurality of abnormal actions, the one or more common features including at least one of a size, a degree of limb extension, a height of limb and posture symmetry of the detection target, and a size of an object held by the detection target.

13. The apparatus of claim 12,
wherein the one or more common features include at least one of a size, a degree of limb extension, a height of limb and posture symmetry of the detection target, and a size of an object held by the detection target.

14. The apparatus of claim 13, wherein the one or more posture feature standards previously determined based on the one or more common features include at least one of
- a standard for volume of a circumscribed cube of the detection target, indicating the size, the degree of limb extension, and the height of limb of the detection target;
- a standard for a center position of the detection target, indicating the height of limb and the posture symmetry of the detection target;
- a standard for projection mapping of the detection target in three adjacent views, indicating the size, the degree of limb extension, the height of limb and the posture symmetry of the detection target, and the object held by the detection target; and
- a standard for symmetry of top-view projection mapping of the detection target, indicating the posture symmetry of the detection target.

15. The apparatus of claim 14, wherein the plurality of abnormal actions include at least one of a waving action, a throwing action, a shooting action, and a jumping action.

16. The apparatus of claim 12, wherein the plurality of abnormal actions include at least one of a waving action, a throwing action, a shooting action, and a jumping action.

17. The apparatus of claim 12,
wherein the one or more obtained current posture features include at least one of a current volume of a circumscribed cube, a current center position, a current projection mapping in three adjacent views, and a current symmetry of top-view projection mapping of the detection target, obtained based on the generated three-dimensional point cloud,
wherein the one or more posture feature standards include at least one of a standard for volume of a circumscribed cube, a standard for a center position, projection mapping in three adjacent views, and a standard for symmetry of top-view projection mapping of the detection target, and
wherein the one or more processors is further configured to execute the computer-readable instructions to determine whether the abnormal situation exists based on the one or more obtained current posture features and the one or more posture feature standards and to determine whether the abnormal situation exists based on the one or more current posture features, and the one or more posture feature standards corresponding to the one or more current posture features.

18. The apparatus of claim 17,
wherein the obtaining of the one or more current posture features of the detection target based on the generated three-dimensional point cloud includes calculating a volume of the circumscribed cube of the generated three-dimensional point cloud as the current volume of the circumscribed cube of the detection target,
wherein the one or more posture feature standards include the standard for the volume of the circumscribed cube of the detection target, and
wherein a relatively larger volume of the circumscribed cube of the detection target is, the relatively greater a probability of the abnormal situation existing is, when the one or more processors is further configured to execute the computer-readable instructions to determine the probability of the abnormal situation existing based on the one or more posture feature standards.

19. The apparatus of claim 17,
wherein the obtaining of the one or more current posture features of the detection target based on the generated three-dimensional point cloud includes calculating the center position of the generated three-dimensional point cloud as the current center position of the detection target,
wherein the one or more posture feature standards include the standard for the center position of the detection target, and
wherein at least one of the relatively larger distance between the current center position of the detection target and a reference center position is, at least one of the relatively higher the current center position of the detection target is, the relatively greater a probability of the abnormal situation existing is, when the one or more processors is further configured to execute the computer-readable instructions to determine the probability of the abnormal situation existing based on the one or more posture feature standards.

20. The apparatus of claim 17,
wherein the obtaining of the one or more current posture features of the detection target based on the generated three-dimensional point cloud includes the generating of the projection mapping of the three-dimensional point cloud in the three adjacent views as the current projection mapping of the detection target in the three adjacent views, the projection mapping in each respective view including relatively farthest points at respective projection cells in the three-dimensional point cloud from the respective view in a direction perpendicular to the view,
wherein the one or more posture feature standards include the standard for the projection mapping of the detection target in the three adjacent views, and
wherein the relatively larger a sum of pixel values of the projection mapping of the detection target in the three adjacent views is, the relatively greater a probability of the abnormal situation existing is, when the one or more processors is further configured to execute the computer-readable instructions to determine the probability of the abnormal situation existing based on the one or more posture feature standards.

* * * * *